(12) United States Patent
Riviere et al.

(10) Patent No.: US 8,167,361 B2
(45) Date of Patent: May 1, 2012

(54) MOTOR VEHICLE FRONT FACE WITH A CROSS MEMBER LEVEL WITH THE MAIN LONGITUDINAL MEMBERS

(75) Inventors: Caroline Riviere, Faverolles (FR); Didier Bierjon, Audincourt (FR)

(73) Assignee: Faurecia Bloc Avant, Nanterre (FR)

( * ) Notice: Subject to any disclaimer, the term of this patent is extended or adjusted under 35 U.S.C. 154(b) by 145 days.

(21) Appl. No.: 12/671,768

(22) PCT Filed: Jul. 29, 2008

(86) PCT No.: PCT/FR2008/051420
§ 371 (c)(1),
(2), (4) Date: Apr. 1, 2010

(87) PCT Pub. No.: WO2009/024708
PCT Pub. Date: Feb. 26, 2009

(65) Prior Publication Data
US 2010/0253102 A1  Oct. 7, 2010

(30) Foreign Application Priority Data
Aug. 3, 2007 (FR) ...................................... 07 56932

(51) Int. Cl.
*B60R 19/26* (2006.01)
*B62D 25/08* (2006.01)
(52) U.S. Cl. .......... 296/193.09; 296/203.02; 296/187.09

(58) Field of Classification Search ................. 180/68.4; 293/121, 132, 133, 136, 154, 155; 296/187.03, 296/187.04, 187.02, 187.09, 193.01, 193.09, 296/203.02
See application file for complete search history.

(56) References Cited

U.S. PATENT DOCUMENTS

| | | | |
|---|---|---|---|
| 6,196,624 B1 | 3/2001 | Bierjon et al. | |
| 6,412,855 B1 | 7/2002 | Cantineau et al. | |
| 6,523,886 B2 | 2/2003 | Hoffner et al. | |
| 6,729,424 B2 * | 5/2004 | Joutaki et al. | 180/68.4 |
| 2002/0100626 A1 * | 8/2002 | Kang et al. | 180/68.4 |
| 2004/0217605 A1 * | 11/2004 | Banry et al. | 293/120 |
| 2005/0134093 A1 * | 6/2005 | Borkowski et al. | 296/203.02 |
| 2007/0182211 A1 * | 8/2007 | Sub | 296/193.09 |
| 2008/0217961 A1 * | 9/2008 | Lustiger et al. | 296/193.09 |

FOREIGN PATENT DOCUMENTS

| | | |
|---|---|---|
| DE | 199 61 754 A1 | 6/2000 |
| DE | 102004057678 A | 6/2006 |

(Continued)

OTHER PUBLICATIONS

International Search Report, dated Sep. 10, 2009, from corresponding PCT application.

*Primary Examiner* — Dennis Pedder
*Assistant Examiner* — Jason S Daniels
(74) *Attorney, Agent, or Firm* — Young & Thompson

(57) ABSTRACT

A motor vehicle front face (1) can be fixed rigidly to the front ends (2) of the main longitudinal members (14) of the motor vehicle. The front face (1) includes:
at least one cross member (8),
at least one lock (76) for fastening the bonnet of the motor vehicle, the or each lock (76) being rigidly fixed to the cross member (8). The cross member (8) is vertically located substantially level with the front ends (2) of the main longitudinal members (4).

19 Claims, 4 Drawing Sheets

FOREIGN PATENT DOCUMENTS

| | | |
|---|---|---|
| EP | 1 232 932 A1 | 8/2002 |
| EP | 1 433 663 A1 | 6/2004 |
| EP | 1 754 650 A1 | 2/2007 |
| FR | 2 783 796 A1 | 3/2000 |
| FR | 2 888 197 A1 | 1/2007 |
| FR | 2 890 621 A1 | 3/2007 |
| FR | 2 901 230 A1 | 11/2007 |
| FR | 2 901 231 A1 | 11/2007 |
| JP | 2002-160668 A | 6/2002 |
| WO | WO 2007/028908 A1 | 3/2007 |

* cited by examiner

MOTOR VEHICLE FRONT FACE WITH A CROSS MEMBER LEVEL WITH THE MAIN LONGITUDINAL MEMBERS

The present invention relates in general to motor vehicle front faces.

More precisely, the invention relates to a motor vehicle front face that can be fixed rigidly to the front ends of the main longitudinal members of the motor vehicle, the front face being of the type comprising:

at least one cross member;

at least one lock for fastening the bonnet of the motor vehicle, the or each lock being rigidly fixed to the cross member.

BACKGROUND OF THE INVENTION

Front faces have to meet a growing number of requirements, based on regulations or imposed by motor vehicle manufacturers. They must therefore incorporate impact absorbers of various types (medium-speed compatibility impacts, low-speed repairability impacts, pedestrian impacts of the head, hip or leg type), allow easy access to the headlight housing for changing bulbs, be as small as possible, in particular in the Z direction, ensure clearances and flushness, in particular as regards the wings and bonnet of the vehicle, and allow easy adaptation of the front face to the various vehicles which constitute a single construction platform.

Front faces are known which allow some of these demands to be met. Thus, FR-A-2 890 621 discloses a front face of which the upper cross member is slightly lowered so as to accommodate an absorber provided to absorb a hip-type pedestrian impact. However, this front face does not make it possible to meet all of the demands listed above.

SUMMARY OF THE INVENTION

In this context, the object of the invention is to propose a front face having a different structure relative to the state of the art and allowing all the criteria listed above to be met.

For this purpose, the invention relates to a front face of the above-mentioned type, characterised in that the cross member is vertically located substantially level with said front ends of the main longitudinal members.

The cross member may also have one or more of the following features, taken individually or in any technically feasible combination:

the front face comprises at least two headlights, the cross member being vertically located at a level lower than that of the headlights;

the front face comprises at least two absorbers suitable for absorbing so-called medium-speed impacts, these medium-speed impact absorbers being inserted between opposite end portions of the cross member and the front ends of the main longitudinal members;

the medium-speed impact absorbers comprise a block made of a cellular material and a casing in which the block of cellular material engages, the casings being formed by the end portions of the cross member;

the cross member is a component made of an integrally moulded plastics material;

the front face comprises a rigid metal cross beam, said beam having transverse ends inserted between the medium-speed impact absorbers and the front ends of the main longitudinal members;

the cross member is a hybrid component comprising a rigid metal insert and a plastics material overmoulded onto the metal insert;

the front face comprises two headlight housings and two arms to support the headlight housings, said support arms being integral with the cross member;

the support arms are integrally moulded with the cross member;

the support arms are attached to the cross member;

the front face comprises means for mounting the support arms on upper longitudinal members of the vehicle;

the headlight housings are rigidly mounted on the support arms by lower regions, the front face comprising means for mounting upper regions of the headlight housings to the wings of the vehicle;

the front face comprises an absorber provided to absorb leg-type pedestrian impacts, fixed rigidly along a frontal face of the cross member;

the front face comprises a radiator, an upper cassette half, located above the cross member, for fixing the radiator in position and means for fixing the upper cassette half rigidly to the cross member;

the means for rigidly fixing the upper cassette half to the cross member are provided so as to be frangible in hip-type pedestrian collisions on the front of the vehicle;

the front face comprises a lower cassette half, located below the cross member and independent of the upper cassette half, for supporting the radiator, the lower cassette half being integral with the cross member;

the front face comprises means, for rigidly fixing the radiator relative to the lower cassette half, suitable for allowing the radiator to pivot together with the upper cassette half in hip-type pedestrian collisions on the front of the vehicle;

the front face comprises a low channel absorber for absorbing leg-type pedestrian impacts, rigidly fixed to the lower cassette half, at a distance below the cross member; and the or each lock is vertically located at a distance above the cross member and is rigidly fixed to the cross member by a rigid strut.

BRIEF DESCRIPTION OF THE DRAWINGS

Other characteristics and advantages of the invention will become clear from the detailed description given below as a non-limiting indication with reference to the accompanying drawings, in which.

DETAILED DESCRIPTION OF THE PREFERRED EMBODIMENTS

In the description that follows, the front, rear, longitudinal and transverse directions should be understood relative to the normal direction of movement of the vehicle.

Figure 1:
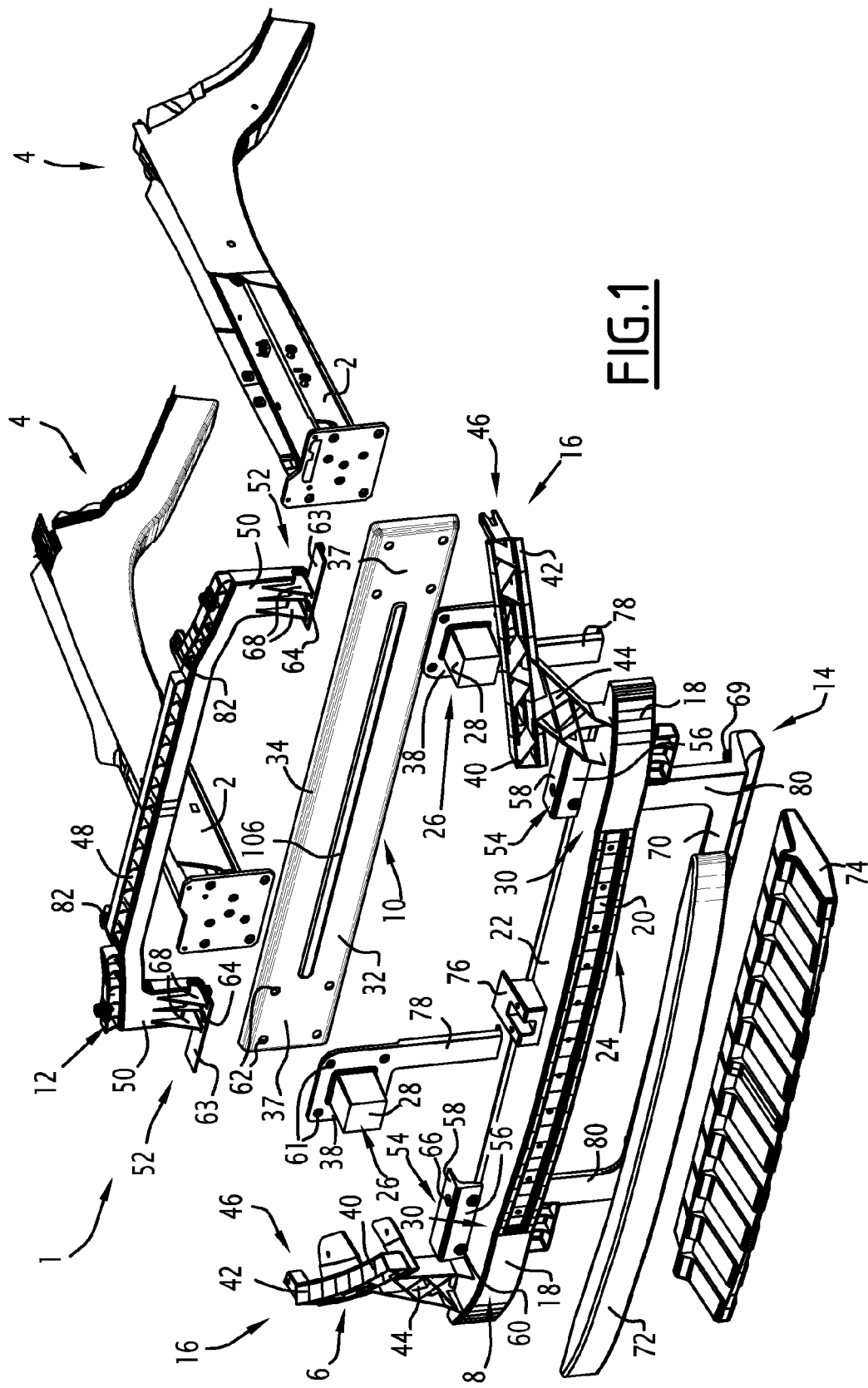
FIG. 1 is an exploded perspective view of a front face according to the invention and of the main longitudinal members, to which the front face is to be attached, of the motor vehicle.

The front face 1 shown in FIG. 1 is an assembly for mounting in one piece on the front ends 2 of the main longitudinal members 4 of the motor vehicle. The front ends of the main longitudinal members are situated in a vertical plane halfway up the front of the vehicle, it being possible for said vehicle to also comprise upper longitudinal members (not shown) for stiffening the vehicle wings, and lower longitudinal members situated beneath the main longitudinal members so as to support a pedestrian impact absorber, for example.

The front face 1 comprises a rigid support structure 6, and a plurality of accessories fixed rigidly to this structure. Included among these accessories are in particular the radiator 7 of the engine cooling circuit (see FIG. 3), an electric fan assembly suitable for creating forced air convection on contact with the radiator, the front headlights, the front direction indicators, the horn, one or more parking sensors, fog lights, components of the ventilation and air conditioning circuit for the vehicle interior, control sensors for the different airbags of the vehicle and impact absorbers.

All these components are usually mounted on the rigid structure of the front face in the workshop of the front face supplier and said front face, with the pre-mounted accessories, is then mounted on the main longitudinal members of the vehicle at the assembly plant of the motor vehicle constructor.

The rigid structure 6 comprises a transverse cross member 8, a rigid transverse beam 10, an upper cassette half 12 to immobilise the radiator 7, a lower cassette half 14 to support the radiator 7 and two arms 16 to support the headlight housings.

The cross member 8 is an integrally moulded component made of a plastics material. It extends transversally substantially over the entire width of the vehicle. In the vertical direction, it is situated substantially level with the front ends 2 of the main longitudinal members. It therefore has opposite end portions 18 arranged longitudinally in the extension of the front ends 2 of the main longitudinal members.

Considered in a plane perpendicular to the transverse direction the cross member 8 is of a U-shaped section, open at the rear. Towards the front of the vehicle it has a closed frontal face 20. At the top and bottom it is delimited by upper 22 and lower 24 closed faces. It is reinforced by integrally moulded struts, for example, arranged in the internal space of the U-shaped cross member, which interconnect the three faces 20, 22, 24 of the cross member.

The front face 1 also comprises different absorbers provided to absorb impacts between the vehicle on which said front face is fitted and another vehicle. The front face comprises in particular absorbers provided to absorb medium-speed impacts on another vehicle, that is, at a relative speed of about 16 km/h. These are known as repairability impacts. The absorbers 26 can be seen in FIG. 1. Absorbers of this type typically comprise a block made of a cellular material 28 and a casing 30 in which the block 28 engages. The block 28 is made of aluminium foam for example, or has a honeycomb structure made of aluminium or an aluminium alloy. To obtain good absorber behaviour under impact, these blocks must be arranged in a casing delimiting a housing formed substantially complementary to the block. The deformation of the casing under the effect of the collision makes it possible to control the behaviour of the block.

As shown in FIG. 1, each casing 30 consists of an end portion 18 of the cross member. These end portions each comprise a plurality of walls defining the reception housing of a block 28.

It can also be seen in FIG. 1 that the blocks 28 are inserted longitudinally between the front ends 2 of the longitudinal members and the end portions 18 of the cross member.

The beam 10 has the function of a bumper beam. It therefore constitutes the structural component of the motor vehicle bumper. Its function is also to stabilise the front portions 2 of the main longitudinal members of the vehicle.

The beam 10 is typically in the form of a plate, i.e. a metal plate. It may for example be obtained by stamping. It comprises a central zone 32 which extends in substantially vertical and transverse plane, and a raised edge 34 directed towards the rear of the vehicle relative to the central zone. The raised edge 34 extends over the entire periphery of the central zone 32. The beam 10 is fixed rigidly to the front portions 2 of the longitudinal members by two opposite transverse ends 37. It is fixed to the longitudinal members by any suitable means, for example welding points. The ends 37 of the beam 10 are inserted longitudinally between the impact absorbers 26 and the front ends 2 of the main longitudinal members.

The impact absorbers 26 each comprise a mounting plate 38 for fixing the impact absorber to the beam 10. The mounting plate 38 is fixed rigidly to the block 28 by welding, for example, or is integral with said block. The mounting plate 38 is fixed to the corresponding end 37 by means of fixing bolts, as described below.

The arms 16 for supporting the headlight housings are of the type described in patent application EP-1 232 932. They are situated, in the vertical direction, at a distance above the cross member 8. Typically, they are integrally moulded with the cross member 8.

As shown in FIG. 1, the arms 16 are elongate in shape and extend from an inner end 40 towards the rear and towards the outside of the vehicle to an outer end 42. Each arm 16 is connected to the cross member 8 by means of a leg 44 which is also integral with the cross member 8.

The front face also comprises means 46 for connecting the outer end 42 of the arm 16 to one of the upper longitudinal members of the vehicle. The means 46 typically comprise indexing means of the arm 16 relative to the vehicle wing and positive fixing means of said arm to the corresponding upper longitudinal member. The indexing means may comprise a pin, for example. The positive fixing means may comprise one or more bolts, for example.

The means 46 rigidly attach the arm 16 to said upper longitudinal member.

The upper cassette half 12 is positioned above the cross member 8. It is generally in the shape of a bow which is open downwards, that is, towards the cross member 8. It is integrally moulded using a plastics material. It comprises a central transverse portion 48 and two legs 50 extending perpendicular to the central portion 48 from the two opposite ends thereof. The legs 50 are fixed rigidly to the cross member 8 by frangible fixing means 52.

Figure 6:
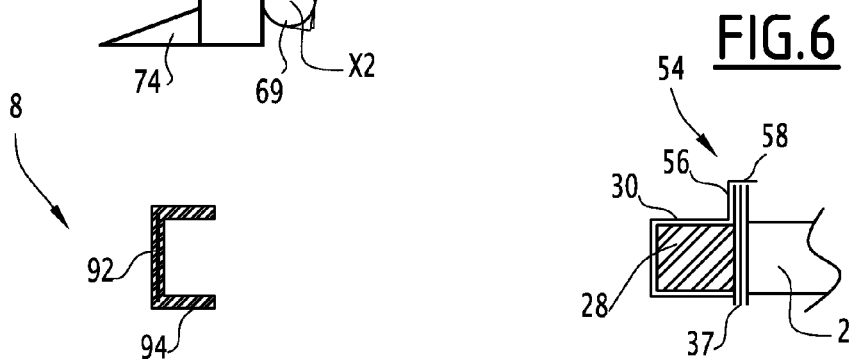
FIG. 6 schematically shows a cross-section of the front face in accordance with the invention.

The cross member 8, as shown in FIG. 6, has angles 54 on its two end portions 18. Each angle 54 has a substantially vertical and transverse flange 56 integral with the cross member 8, and a substantially horizontal flange 58 extending towards the rear from the vertical flange 56. The angles 54 are integrally moulded with the cross member 8. The vertical flange 56 has two orifices 60. The orifices 60 are placed facing corresponding orifices 61 and 62 provided in the mounting plate 38 and in the end 37 of the beam corresponding to the angle 54 respectively. Bolts engage through the orifices 60, 61, 62 placed so as to correspond, in such a way that the beam 10, the mounting plate 38 and the end 37 of the cross member are pressed together and interlock.

The frangible fixing means 52 comprise sole plates 63 integral with the free ends of the legs 50 and applied above the horizontal flanges 58 of the angles. The sole plates 63 and the flanges 58 have orifices 64 and 66 arranged so as to correspond. Bolts for fixing the upper cassette half to the cross member engage in the orifices 64 and 66. The legs 50 extend substantially perpendicular to the sole plates 63. The legs 50 are connected to the sole plates 63 by a plurality of fins 68 made of a plastics material. Recesses (not shown) are provided in the sole plate 63 at the base of the fins 68. The sole plates 63, the fins 68 and the recesses form the frangible fixing means 52. As detailed below, the means 52 make it possible for the upper cassette half to be retractable in a hip-type pedestrian collision, in accordance with the principles of applications FR 06 04571 and FR 06 04577 filed by the applicant.

The lower cassette half 14 is arranged beneath the cross member 8. It is in a bow shape similar to that of the upper cassette half. The bow is open at the top, that is, towards the cross member 8. The lower cassette half has no direct connection with the upper cassette half. The lower cassette half 14 is typically integrally moulded with the cross member 18. The connection means between the lower cassette half 14 and the cross member 8 are not frangible in a pedestrian collision. The lower cassette half 14 comprises two eyelets 69 to support and immobilise the lower portion of the radiator. The eyelets 69 project towards the rear of the vehicle relative to the central transverse portion 70 of the lower cassette half.

The front face 1 comprises an absorber 72 suitable for absorbing leg-type pedestrian impacts. The absorber 72 is a plastic material foam bar fixed rigidly to the frontal face 20 of the cross member 8. The absorber 72 extends over most of the transverse length of the cross member 8, substantially from one main longitudinal member to the other.

The front face comprises another absorber 74, provided to absorb leg-type pedestrian impacts, fixed rigidly to the central portion 70 of the lower cassette half. This so-called low channel absorber has the form of a substantially horizontal tray made of a plastic material foam. It extends towards the front from the central portion 70 of the lower cassette half.

The front face also comprises a lock 76 for fastening the bonnet of the motor vehicle. This lock 76 is fixed rigidly to the upper face 22 of the cross member, transversely substantially halfway between the two longitudinal members 4, in other words in the centre of the cross member 8.

Each of the mounting plates 38 for fixing the absorbers to the beam 10 comprises an extension 78 serving as a stiffener for a vertical leg 80 of the lower cassette half. The stiffeners 78 extend downwards from the mounting plate 38 and are integral therewith. They are laid flat against the legs 80, at the rear thereof.

Figure 2:
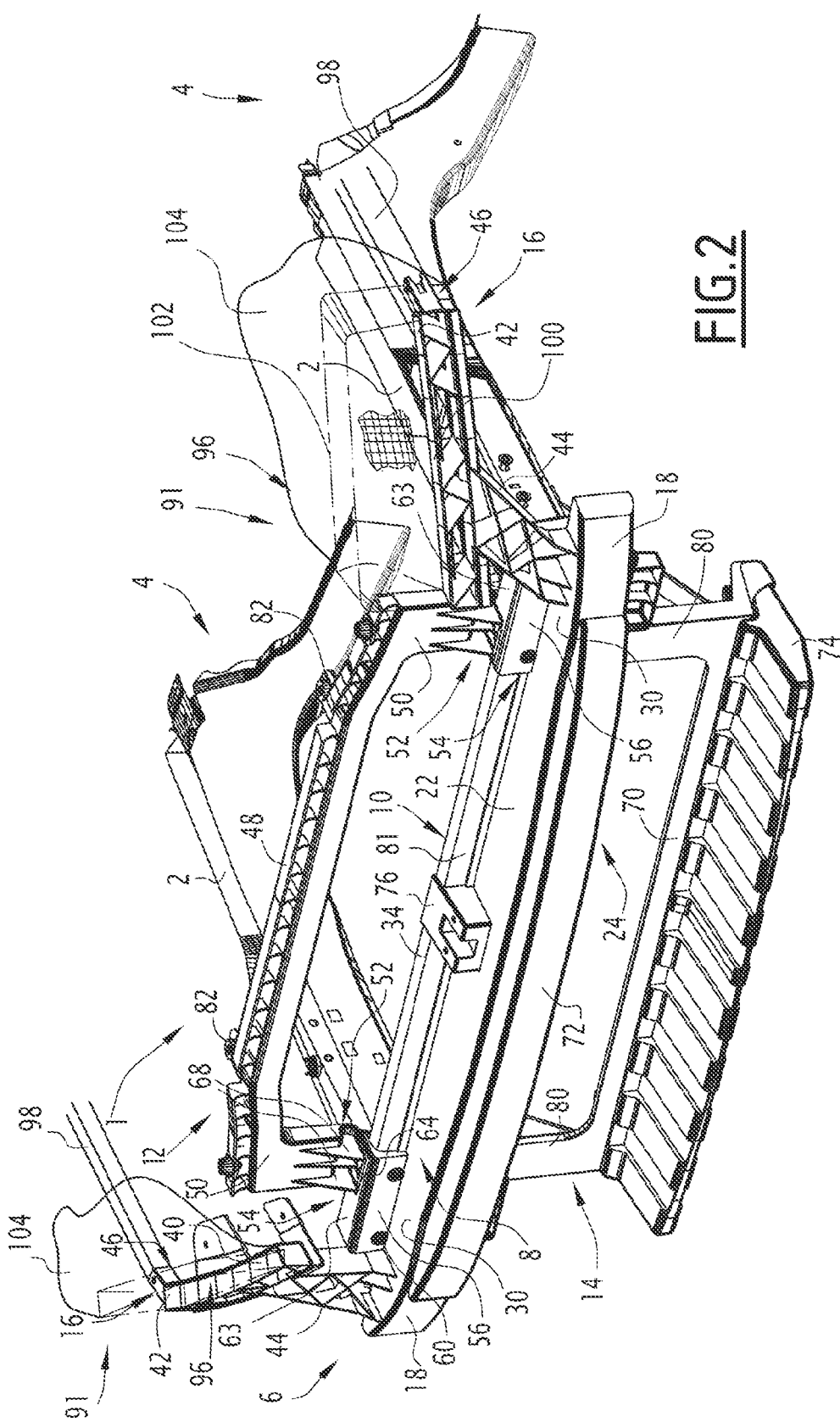
FIG. 2 is a perspective view, in the assembled state, of the front face of FIG. 1.

In the assembled state of the front face, shown in FIG. 2, the blocks made of cellular material 28 engage inside the cross member 8, the mounting plate 38 resting against the vertical flanges 56 of the angles. The mounting plate 38 is sandwiched between the flange 56 and the end 37 of the beam. The beam 10 is applied to the open rear face of the cross member 8 and closes said rear face. The lower 14 and upper 12 cassette halves are arranged substantially in the same transverse and vertical plane, above and beneath the cross member 8.

As shown in FIG. 2, the upper transverse edge 81 of the beam projects above the upper face 22 of the cross member. The lock 76 rests on said edge 81.

The radiator 8 rests on the eyelets 69 of the lower cassette half. It comprises spigots projecting downwards, these spigots engaging in the eyelets 69. The spigots cooperate with the eyelets 69 to immobilise the lower portion of the radiator in translation in a horizontal plane.

In addition, the upper cassette half comprises traversing orifices 82 with vertical axes. Pins engage through the orifices 82. Their ends engage in reception housings provided on the upper portion of the radiator. The pins are locked in position relative to the upper cassette half by removable keys. The means for immobilising the radiator relative to the upper and lower cassette halves are known per se and will not be described in more detail here.

By their lower portion 100, the headlight housings 96 of headlights 91 rest on the arms 16 and are fixed rigidly to these arms 16. Moreover, the front face comprises means, which are not shown, for fixing the upper portions 102 of the headlight housings 96 to the vehicle wings 104.

Figure 3:
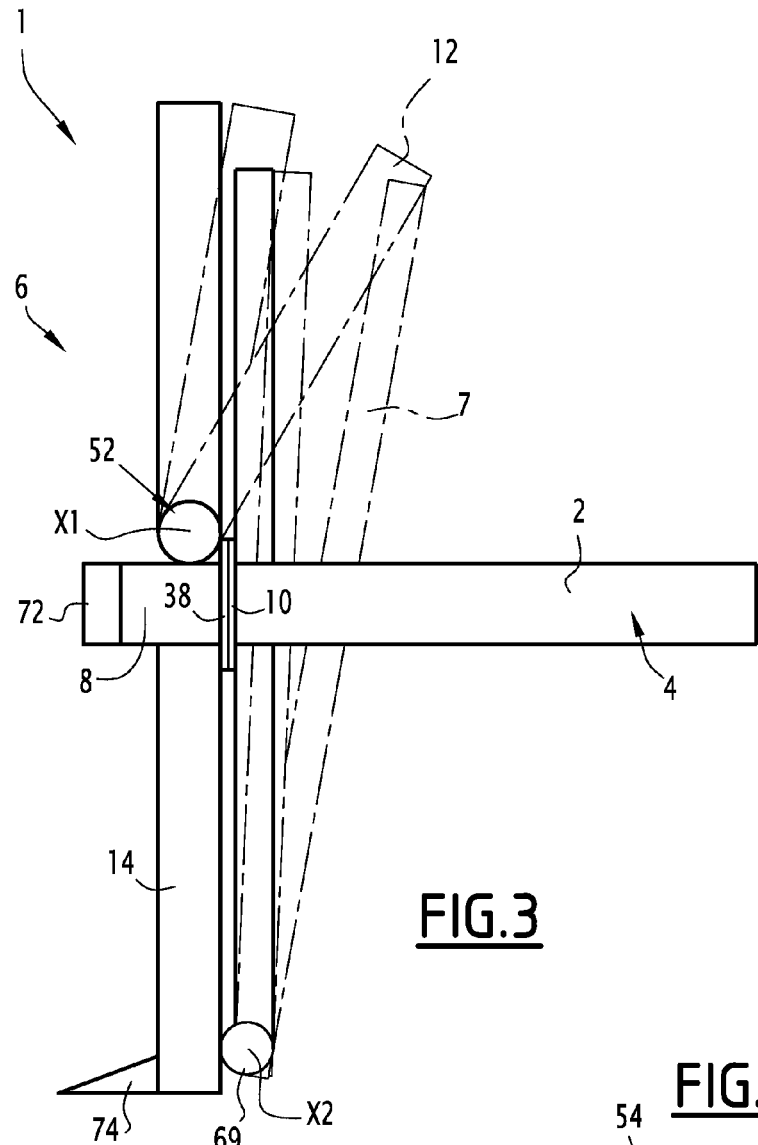
FIG. 3 is a diagrammatic illustration, in a side view, of the front face of FIG. 1, illustrating the behaviour of the upper cassette half and the radiator in a hip-type pedestrian collision.

In a pedestrian collision, the hip or head of the pedestrian may hit the vehicle bonnet substantially in the region of the upper cassette half 12. If the energy transmitted by the impact to the upper cassette half exceeds a predetermined limit, the connection means 52 break and the cassette half 12 tilts rearwards and downwards about a transverse axis X1 passing substantially through the sole plates 63. As shown in FIG. 3, the tilting of the upper cassette half causes the radiator 7 to tilt about a transverse axis X2 passing substantially through the eyelets 69. For its part, the lower cassette half does not move. The pivoting of the radiator relative to the lower cassette half is made possible by the fact that the lower portion of the radiator is immobilised simply by the spigots of the radiator engaging in the eyelets 69 of the lower cassette half. Similarly, a relative pivoting of the radiator 7 in relation to the upper cassette half 12 occurs, which is made possible by the fact that the upper cassette half is connected to the radiator by pins which simply engage in housings provided on the radiator.

The front face described above has many advantages.

Since the cross member is vertically located substantially level with the front ends of the main longitudinal members, it is possible to provide the front face with an entirely novel structure, allowing the various legal requirements and the requirements imposed by motor vehicle manufacturers to be met. In particular, the front face no longer comprises an upper cross member passing above the headlight housings 96 to provide the connection to the upper longitudinal members 98 of the vehicle. For this reason, access to the headlight housings 96 to change the bulbs is facilitated considerably.

The cross member does not reduce the air flow for cooling the radiator, as it is incorporated into the impact absorption zone occupied in the known art by the bumper beam.

The upper cassette half is not a structural component, since neither the stability between the main longitudinal members nor that between the upper longitudinal members 98 and the main longitudinal members is provided by said upper cassette half. The upper cassette half may therefore be made of a less rigid material which is more suitable with regard to the requirements for absorbing pedestrian impacts involving the hips and head.

By contrast, the lower cassette half needs to be stiffened in such a way as to support the radiator, any other cooling components, and the low absorber.

The front face elements, which vary from one vehicle to another within the same constructor range, are brought together on the cross member. These elements are basically the position of the headlight supports, the location of the lock and the location of the connection points to the upper longitudinal members of the wing.

The front face disclosed above may have many variants.

Figure 5:
FIG. 5 schematically shows a section of a cross member in accordance with the invention.

The cross member 8 may not be an integrally moulded component made of a plastics material, but comprise a metal insert and a plastics material 94 moulded over the insert (see FIG. 5). In a variant, the beam 10 may form the metal insert. In this case, the beam 10 is placed in front of the medium-speed impact absorbers, which are fixed directly to the front ends of the main longitudinal members.

The portion of the cross member forming a reception casing of the block made of cellular material for the medium-speed impact absorbers may be reinforced by a metal insert.

The support arms of the headlight housings 96 may not be integral with the cross member, but be components attached to the cross member 8.

The lower cassette half 14 may not be integral with the cross member 8, but, like the upper cassette half, be attached to the cross member.

The integral impact absorber of the lower cassette half may be integrally moulded with said lower cassette half. This absorber may also serve to absorb so-called compatibility impacts between vehicles, that is, impacts at a low speed between 2.5 km/h and 4 km/h.

Figure 4:
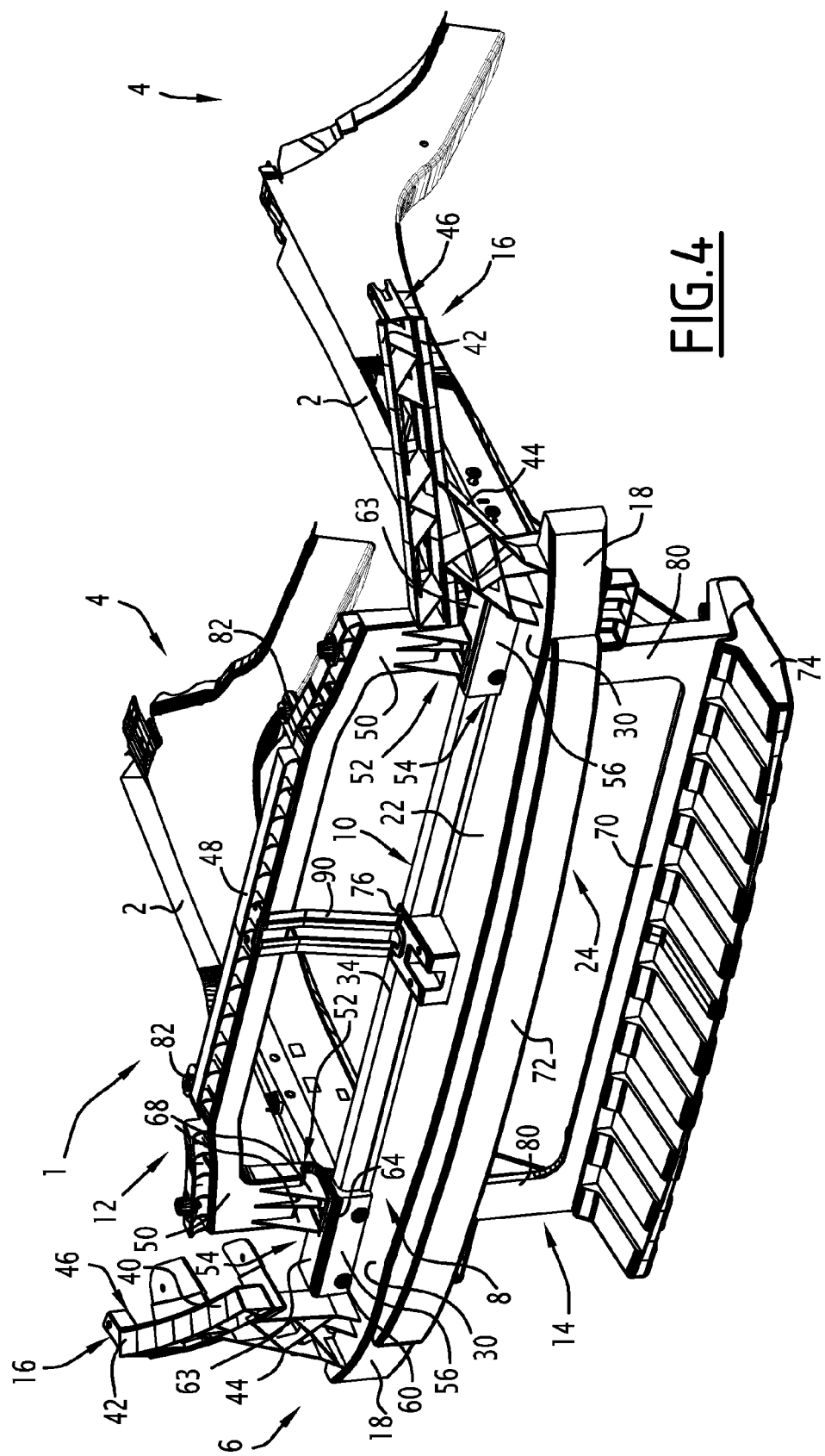
FIG. 4 is a perspective view similar to that of FIG. 2 for a variant of the front face in which the lock is located at a distance above the cross member.

As shown in FIG. 4, the lock 76 is not necessarily located on the upper face 22 of the cross member. For stylistic reasons, the lock 76 may be arranged at a distance above the cross member 18 and be made integral with said cross member 8 by a strut 90. The strut 90 may be a rigid metal component. The strut 90 may also be a plastics material component and may, in a variant, comprise weakening means in such a way that in collisions on the bonnet in the region of the lock 76, the strut 90 can retract in such a way as not to injure the pedestrian.

The front face may comprise not one, but two or more locks for fastening the bonnet, the locks being distributed along the cross member and all being integral with the cross member.

The invention claimed is:

1. A motor vehicle front face, the front face (1) being capable of being fixed rigidly to front ends (2) of main longitudinal members (4) of a motor vehicle, the front face (1) comprising:
   at least one cross member (8);
   at least one lock (76) for fastening a bonnet of the motor vehicle, the or each lock (76) being rigidly fixed to the cross member (8);
   an upper cassette half (12), located above the cross member (8), for fixing a radiator (7) in position;
   means (52) for fixing the upper cassette half (12) rigidly to the cross member (8); and
   a lower cassette half (14) for supporting the radiator (7), the lower cassette half (14) located below the cross member (8) and integral with the cross member (8);
   wherein the cross member (8) is vertically located substantially level with said front ends (2) of the main longitudinal members (4).

2. The front face according to claim 1, further comprising:
   at least two headlights (91), the cross member (8) being vertically located at a level lower than that of the headlights.

3. The front face according to claim 1, further comprising:
   at least two impact absorbers (26) suitable for absorbing so-called medium-speed impacts, said impact absorbers (26) being inserted between opposite end portions (18) of the cross member (8) and the front ends (2) of the main longitudinal members (4).

4. The front face according to claim 3, wherein the medium-speed impact absorbers (26) comprise a block (28) made of a cellular material and a casing (30) in which the block of cellular material (28) engages, the casings (30) being formed by the end portions (18) of the cross member (8).

5. The front face according to claim 3, wherein the cross member (8) is an integrally moulded component made of a plastics material.

6. The front face according to claim 3, further comprising:
   a rigid metal cross beam (10), said beam (10) having transverse ends (37) inserted between the impact absorbers (26) and the front ends (2) of the main longitudinal members (4).

7. The front face according to claim 3, wherein the cross member (8) is a hybrid component comprising a rigid metal insert and a plastics material overmoulded onto the metal insert.

8. The front face according to claim 1, further comprising:
   two headlight housings and two support arms (16) to support the headlight housings, said support arms (16) being integral with the cross member (8).

9. The front face according to claim 8, wherein the support arms (16) are integrally moulded with the cross member (8).

10. The front face according to claim 8, wherein the support arms (16) are attached to the cross member (8).

11. The front face according to claim 8, further comprising:
    means (46) for mounting the support arms (16) on upper longitudinal members of the vehicle.

12. The front face according to claim 8, wherein the headlight housings are rigidly mounted on the support arms (16) by lower regions, the front face (1) comprising means for mounting upper regions of the headlight housings to wings of the vehicle.

13. The front face according to claim 1, further comprising:
    an absorber (72) provided to absorb leg-type pedestrian impacts, fixed rigidly along a frontal face (20) of the cross member (8).

14. The front face according to claim 1, wherein the means (52) for rigidly fixing the upper cassette half (12) to the cross member (8) are provided so as to be frangible in hip-type pedestrian collisions on the front of the vehicle.

15. The front face according to claim 1, further comprising:
    means (69), for rigidly fixing the radiator (7) relative to the lower cassette half (14), suitable for allowing the radiator (7) to pivot together with the upper cassette half (12) in hip-type pedestrian collisions on the front of the vehicle.

16. The front face according to claim 1, further comprising:
    a low channel absorber (74) for absorbing leg-type pedestrian impacts, rigidly fixed to the lower cassette half (14), at a distance below the cross member (8).

17. The front face according to claim 1, wherein the or each lock (76) is vertically located at a distance above the cross member (8) and is rigidly fixed to the cross member (8) by a rigid strut (90).

18. The front face according to claim 2, further comprising:
    at least two impact absorbers (26) suitable for absorbing so-called medium-speed impacts, said impact absorbers (26) being inserted between opposite end portions (18) of the cross member (8) and the front ends (2) of the main longitudinal members (4).

19. The front face according to claim 1, wherein the lower cassette half (14) is free of direct contact with the upper cassette half (12).

* * * * *